United States Patent
Lanz et al.

(10) Patent No.: US 11,728,070 B2
(45) Date of Patent: Aug. 15, 2023

(54) SYSTEMS AND METHODS FOR INJECTING ELECTRICAL CABLES WITH A FLUID

(71) Applicant: Instrument Manufacturing Company, Manchester, CT (US)

(72) Inventors: Benjamin Thomas Lanz, Ellington, CT (US); Wayne J. Chatterton, Cambridge, OH (US); Matthew Helm Spalding, Cornelius, NC (US); Charles William Shannon, Ramona, CA (US)

(73) Assignee: Instrument Manufacturing Company, Manchester, CT (US)

( * ) Notice: Subject to any disclaimer, the term of this patent is extended or adjusted under 35 U.S.C. 154(b) by 0 days.

(21) Appl. No.: 17/887,146

(22) Filed: Aug. 12, 2022

(65) Prior Publication Data
US 2022/0384067 A1    Dec. 1, 2022

Related U.S. Application Data

(63) Continuation of application No. 16/848,508, filed on Apr. 14, 2020, now abandoned.

(51) Int. Cl.
| | |
|---|---|
| H01B 7/285 | (2006.01) |
| H01R 13/53 | (2006.01) |
| H02G 1/16 | (2006.01) |
| H02G 15/22 | (2006.01) |
| H01R 13/00 | (2006.01) |
| F16L 15/00 | (2006.01) |
| H01R 13/42 | (2006.01) |
| H01R 4/56 | (2006.01) |
| H01B 7/28 | (2006.01) |

(52) U.S. Cl.
CPC ............ *H01B 7/285* (2013.01); *F16L 15/008* (2013.01); *H01B 7/28* (2013.01); *H01B 7/2813* (2013.01); *H01R 4/56* (2013.01); *H01R 13/005* (2013.01); *H01R 13/42* (2013.01)

(58) Field of Classification Search
CPC ...... H01R 13/005; H02G 15/20; H02G 15/22; H01B 7/423
See application file for complete search history.

(56) References Cited

U.S. PATENT DOCUMENTS

| | | | | |
|---|---|---|---|---|
| 3,673,541 | A * | 6/1972 | Volinskie | H01R 13/005 285/119 |
| 4,545,133 | A * | 10/1985 | Fryszczyn | H02G 1/14 34/442 |
| 5,197,895 | A * | 3/1993 | Stupecky | H01R 13/005 604/905 |
| 6,332,785 | B1 * | 12/2001 | Muench, Jr. | H02G 15/184 439/88 |
| 6,517,366 | B2 * | 2/2003 | Bertini | H01R 13/5216 439/190 |

(Continued)

*Primary Examiner* — Hoa C Nguyen
*Assistant Examiner* — Amol H Patel
(74) *Attorney, Agent, or Firm* — McCarter & English, LLP (57) ABSTRACT

An adapter probe configured for injecting fluid (e.g., liquid, gas) into at least one electrical cable. Particularly for injecting an electrical cable with a fluid when the electrical cable is affixed to a separable connector (e.g., elbow separable connector). Separable connector may be configured to connect sources of energy (e.g., transformer, circuit breaker) with distribution systems via electrical cable (or cable section).

13 Claims, 10 Drawing Sheets

(56) References Cited

U.S. PATENT DOCUMENTS

| | | | |
|---|---|---|---|
| 8,967,178 B2* | 3/2015 | Steele | F16L 55/10 |
| | | | 137/67 |
| 2002/0058436 A1* | 5/2002 | Saba | F16L 25/01 |
| | | | 439/191 |
| 2014/0017928 A1* | 1/2014 | Shah | H01R 13/62 |
| | | | 439/350 |
| 2015/0282862 A1* | 10/2015 | Warren | A61B 18/1206 |
| | | | 606/34 |
| 2017/0314692 A1* | 11/2017 | Bertini | B29C 45/20 |
| 2018/0264832 A1* | 9/2018 | Bartel | B41J 2/1753 |
| 2019/0097340 A1* | 3/2019 | Birkholz | H01R 13/005 |
| 2019/0175261 A1* | 6/2019 | Rombach | A61B 1/0052 |
| 2020/0169030 A1* | 5/2020 | Ferderer | H01R 13/005 |
| 2021/0057839 A1* | 2/2021 | Haney | B23K 9/295 |
| 2021/0277723 A1* | 9/2021 | Feng | H01R 24/38 |

* cited by examiner

SYSTEMS AND METHODS FOR INJECTING ELECTRICAL CABLES WITH A FLUID

RELATED APPLICATIONS

The present application is a continuation of U.S. patent application Ser. No. 16/848,508, filed on Apr. 14, 2020, which is incorporated by reference herein in its entirety.

FIELD OF DISCLOSURE

The present disclosure relates to systems, devices, and methods for injecting fluid into at least one electrical cable.

BACKGROUND

Typical load and dead break separable connectors or cable terminations (herein referred to as a "separable connectors") are used to connect medium or high voltage underground electrical cables to sources of energy and or sources of loads. The separable connectors typical include a termination port with an electrical pin or probe (herein referred to as an "electrical probe") for electrically connecting the electrical cable to the source of energy or load. The separable connector typically includes a connection port through which the electrical cable is inserted to operable connect the electrical cable to the probe. Separable connectors generally have an elbow configuration where the angle between the termination port and the connection port is a right angle (90°). However, separable connectors can have other configurations, such as a "T" type or even a "live front" configuration. There are at least two (2) types of elbow applications: load break and dead break.

SUMMARY

The present disclosure provides advantageous systems, devices, and methods for injecting fluid (e.g., liquid, gas) into at least one electrical cable. For example, the systems, devices, and methods can provide for injecting an electrical cable with a fluid when the electrical cable is affixed to an existing separable connector (e.g., elbow connector). The existing separable connector may or may not have a special modification for a fluid injection system via an access port disposed between the termination port and the connection port. However, exemplary embodiments do not require the access port, but rather facilitate injection of fluid into the electrical cable via the termination port.

In accordance with embodiments of the present disclosure, the separable connector can be removed from the source or load and the existing electrical probe can be removed from the separable connector. An adapter probe can be configured and adapted to interface with the separable connector and replace the removed electrical probe. The adapter probe can facilitate connection of the separable connector to a fluid injection system. The adapter probe can include a distal end and a proximal end, and can include a passageway that extends at least partially between the distal end and the proximal end. The distal end and/or the proximal end may include features/elements for connecting with an adjacent device (e.g., connector, hose, pipe, adapter, junction, fluid feed tank, conduit, discard/vacuum tank). The separable connector with the adapter probe installed therein can be connected to a fluid feed tank at one end of the electrical cable to place the electrical cable in fluid communication with a fluid feed tank via separable connector and the adapter probe. At the other end of the electrical cable, another separable connector with the adapter probe in place of the electrical probe can be connected to a discard/vacuum tank to place the electrical cable in fluid communication with a discard/vacuum tank via the separable connector with the adapter probe.

In accordance with exemplary embodiments of the present disclosure, a method for introducing fluid to an electrical cable is disclosed. The method can include (i) disconnecting a termination port of a separable connector from a source of energy; (ii) removing an electrical probe from the termination port of the separable connector; (iii) affixing an adapter probe to the termination port of the separable connector, wherein the termination port is in fluid communication with a connection port of the separable connector; and (iv) introducing a fluid through the adapter probe into the separable connector via the termination port for receipt within insulation of an electrical cable inserted in the connection port.

In accordance with exemplary embodiments of the present disclosure, a fluid injection system for introducing fluid to an electrical cable is disclosed. The system can include a separable connector having a connection port and a termination port, wherein the electrical cable is inserted into the connection port and the termination port is configured to be connected to a terminal of a source of energy. The connection and termination ports are in fluid communication with each other. In a first state, the separable connector can include an electrical probe associated with the termination port to facilitate electrical connection with the terminal of the power device. In a second state, the separable connector can include an adapter probe associated with the termination port in place of the electrical probe, the adapter probe can be configured to introduce a fluid into insulation of the electrical cable via the termination port.

In accordance with exemplary embodiments of the present disclosure, the adapter probe can be releasably engaged with the separable connector. For example, the adapter probe can be threadingly engaged with a cable coupler positioned within the separable connector and in fluid communication with the insulation of the electrical cable.

In accordance with exemplary embodiments of the present disclosure, the adapter probe can be configured to introduce a fluid into a separable connector. The adapter probe can include a body having a proximal end and a distal end, which can be configured and dimensioned to be at least partially inserted into the termination port of a separable connector and to form a seal between the body and the termination port. The body can be configured with a passageway extending through the body from the proximal end to the distal end to provide a pathway through which fluid can flow into the termination port beyond the seal and can be released within the sealed chamber of the separable connector. A fluid engagement feature can be positioned with respect to the proximal end of the body and can be configured to introduce the fluid through the passageway into the cavity of the separable connector. The pathway can also allow fluid to flow out of the termination port from the sealed chamber of the separable connector. A fluid engagement feature can be positioned with respect to the proximal end of the body and can be configured to receive the fluid output through the passageway.

In accordance with exemplary embodiments of the present disclosure, the body of the adapter probe can define a length between three (3) inches and twelve (12) inches. The disclosed passageway may define a diameter between one sixteenth ($\frac{1}{16}$) inch and one (1) inch.

Additional advantageous features, functions and implementations of the fluid injection, devices, systems and methods will be apparent from the description of exemplary embodiments described below, particularly when read in conjunction with the appended figures.

BRIEF DESCRIPTION OF THE FIGURES

The systems and methods of the present disclosure will be better understood on reading the description which follows, given solely by way of non-limiting example and made with reference to the drawings in which.

DETAILED DESCRIPTION

Referring now to the drawings, like parts are marked throughout the specification and drawings with the same reference numerals, respectively. Drawing figures are not necessarily to scale and in certain views, parts may have been exaggerated for purposes of clarity.

Figure 1:
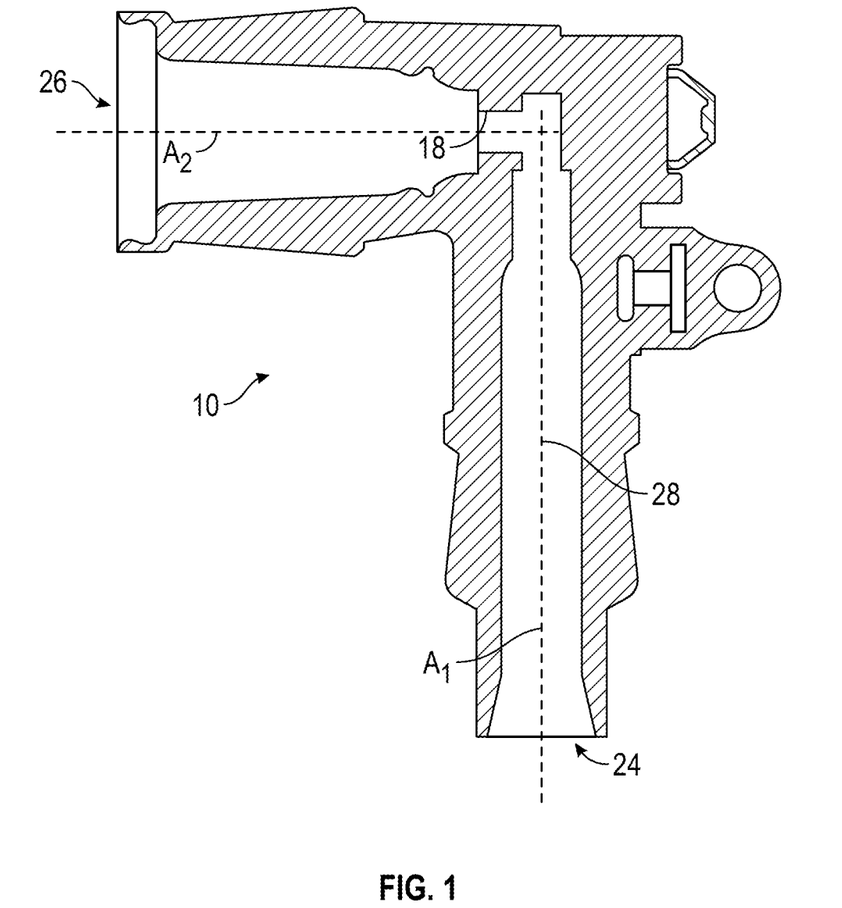
FIG. 1 schematically depicts a cross-sectional view of a separable connector without the adapter probe, electrical cable, or cable coupler to enhance the visualization of the cavity, according to embodiments of the present disclosure.

FIG. 1 illustrates a housing of a separable connector 10. The separable connector 10 can include a connection port 24 and a termination port 26, which can be in communication with each other to create a cavity 28. In an exemplary embodiment, the cavity 28 can be in communication (e.g., fluid communication) with the connection port 24 and the termination port 26. The separable connector 10 show in FIG. 1 is an elbow connector where the connection port 24 extends along a longitudinal axis $A_1$ and the termination port 26 extends perpendicularly relative to the connection port along a longitudinal axis $A_2$. The cavity can include a sealing interface 18 corresponding to a reduced area of the cavity proximate to an elbow portion of the separable connector 10 that can interface with a probe when the probe is inserted into the separable connector 10 to create a seal between an outer surface of the probe and an inner surface of the separable connector 10 at the sealing interface 18.

Figure 2A:
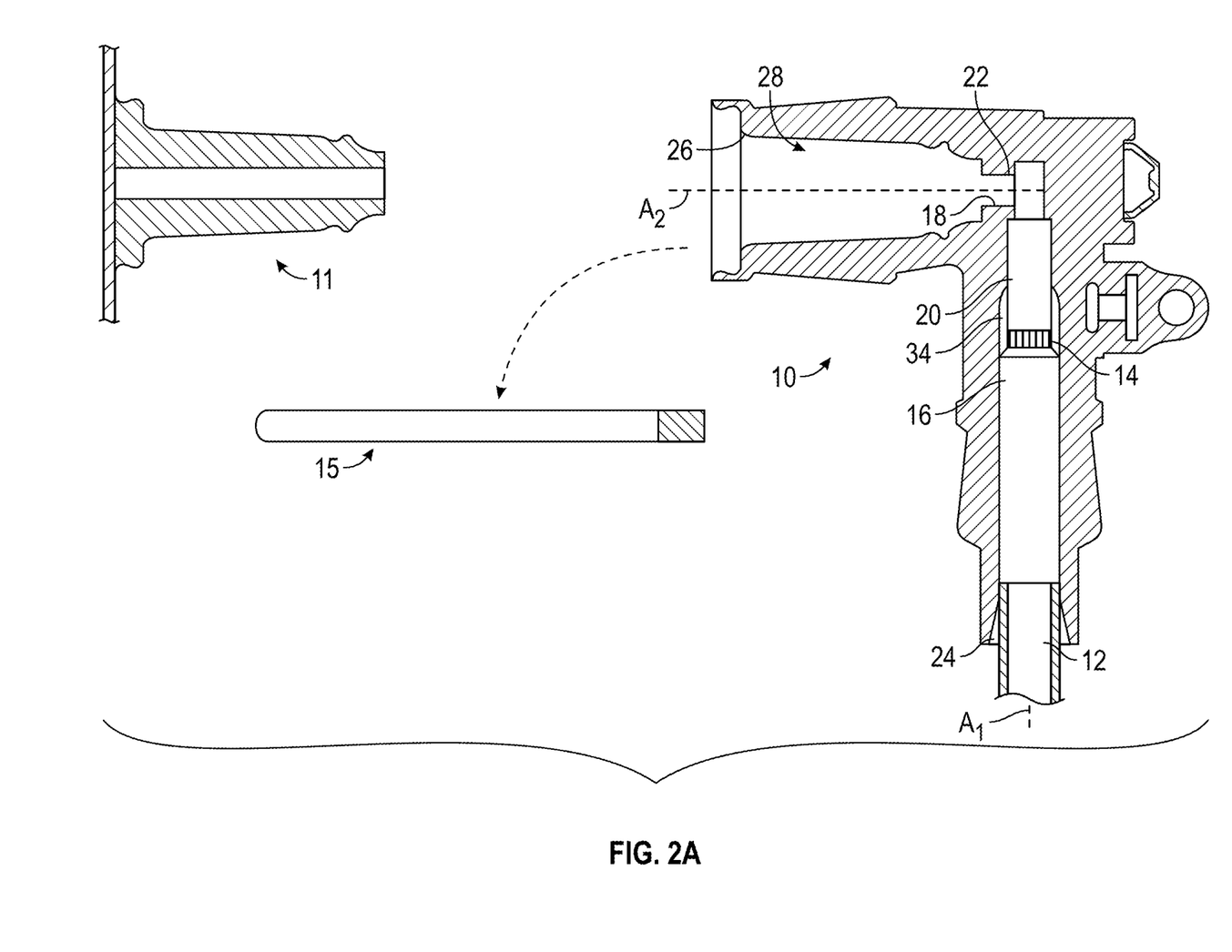
FIG. 2A schematically depicts a cross-sectional view of a separable connector with an electrical probe removed, according to an embodiment of the present disclosure.

FIG. 2A depicts an example separable connector 10 (e.g., elbow connector) configured to connect an electrical cable 12 to a power terminal 11 of a source of energy (e.g., transformer, circuit breaker). The electrical cable 12 includes, in part, a conductive core 14 surrounded by an insulation layer 16. The conductive core 14 may include electrically conductive strands. The electrical cable 12 may be rated for any medium voltage (MV) or high voltage (HV) class. The cavity 28 of the separable connector 10 houses the electrical cable 12 including the insulation layer 16, the conductive core 14, a cutback gap 34, and a cable connector 20, each of which can be inserted through the connection port 24 into the cavity 28. The cavity 28 also partially houses an electrical probe 15 or an adapter probe 50 (FIG. 2B) through the termination port 26. The electrical probe 15 or the adapter probe 50 can be at least partially engaged with the cable connector 20.

In an exemplary embodiment, one end of the electrical cable 12 can be received via a connection port 24 of the separable connector 10 and the cable connector 20 of the separable connector 10 can electrically and mechanically connect the exposed portion of the conductive core 14 of the electrical cable 12 to the electrical probe 15 configured to be received by a termination port 26 to connect the electrical probe 15 to the separable connector 10. The connection between the electrical probe 15, cable connector 20, and the conductive core 14 can be encompassed by the housing of the separable connector 10. As shown in FIG. 2A, the electrical probe 15 is disconnected and removed from the separable connector 10.

In an exemplary embodiment, engagement between the cable connector 20 and the conductive core 14 can produce the cut back gap 34 between the cable connector 20 the insulation layer 16 having a length measured parallel to the longitudinal axis A1. For example, the gap 34 can have a length of approximately 1/32 of an inch to approximately 1 inch. The gap 34 can, at least in part, facilitate the transmission of injection fluid (e.g., liquid, gas) for receipt by the electrical cable 12 between the conductive core 14 and the insulation layer 16, as is explained in more detail below. The cable connector 20 can include the engagement portion 22 (e.g., a threaded portion), which can be positioned in close proximity to the termination port 26. The engagement portion 22 can be at least partially aligned with the longitudinal axis $A_2$ of the termination port 26. The engagement portion 22 can extend at least partially through the cable connector 20 so as to create a through hole.

The electrical probe 15 is configured to, at least in part, electrically connect the power terminal 11 to the electrical cable 12. The electrical probe 15 can be a solid conductive rod or shaft that is inserted into the separable connector 10, and the separable connector 10 can be installed over the power terminal 11 such that the electrical probe 15 electrically and mechanically engages the power terminal to electrically couple the electrical cable 12 to the power terminal 11 via the cable connector 20. The electrical probe 15 can be removed from the separable connector and replaced with an adapter probe, as described herein. For example, the electrical probe 15 can be threadingly engaged with an engagement portion 22 of the cable connector 20 such that the electrical probe 15 can unscrewed to disengage the electrical probe 15 from the cable connector 20 and the separable connector 10.

Figure 2B:
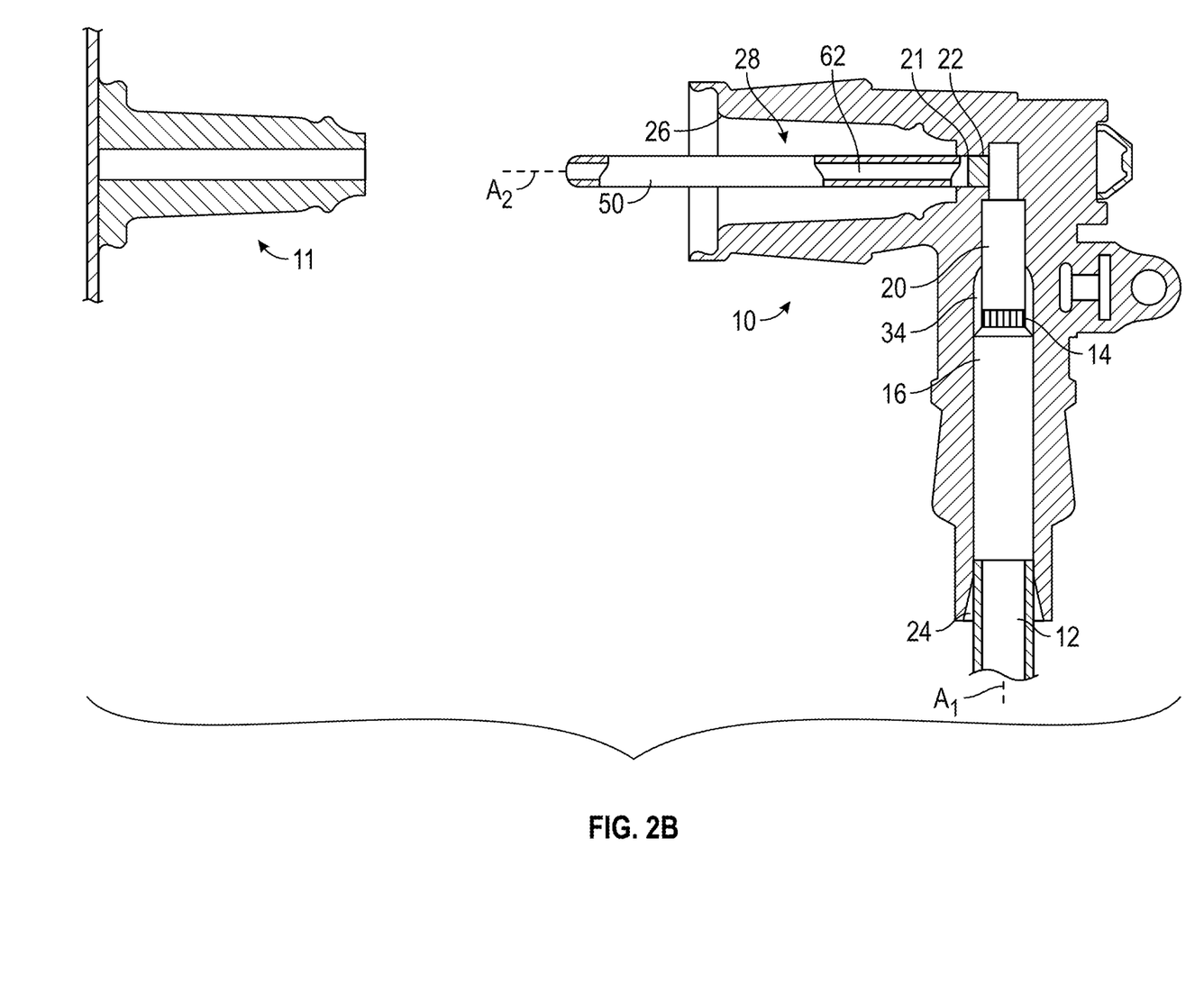
FIG. 2B schematically depicts a cross-sectional view of a separable connector with an adapter probe attached, according to an embodiment of the present disclosure.

FIG. 2B shows the separable connector 10 of FIG. 2A with the electrical probe 15 removed and an adapter probe 50 engaged with the cable connector 20 of the separable connector 10 in place of the electrical probe 15. As shown in FIG. 2B, the engagement portion 22 of the separable connector 10 can be configured and adapted to at least partially receive the adapter probe 50, which may include a corresponding engagement portion (e.g., a threaded portion 64 shown in FIGS. 3A and 3B) that is configured to interface with the engagement portion 22 (e.g., the engagement portion of the adapter probe 50 threadingly engages the engagement portion 22 of the cable connector 20). The adapter probe 50 can have a passageway 62 formed therein. During this engagement a pathway can be created that extends through the passageway 62 of the adapter probe 50 and continues through the through-hole in the cable connector 20 and into the cavity 28. The adapter probe 50 can include a groove/indent formed about an outer surface of the adapter probe 50. A sealing element, such as an O-ring 21, can be disposed at a groove/indent to assist in creating an air/liquid tight seal at the termination port 26 between the outer surface of the adapter probe 50 and the inner surface of the separable connector 10.

Figure 3A:
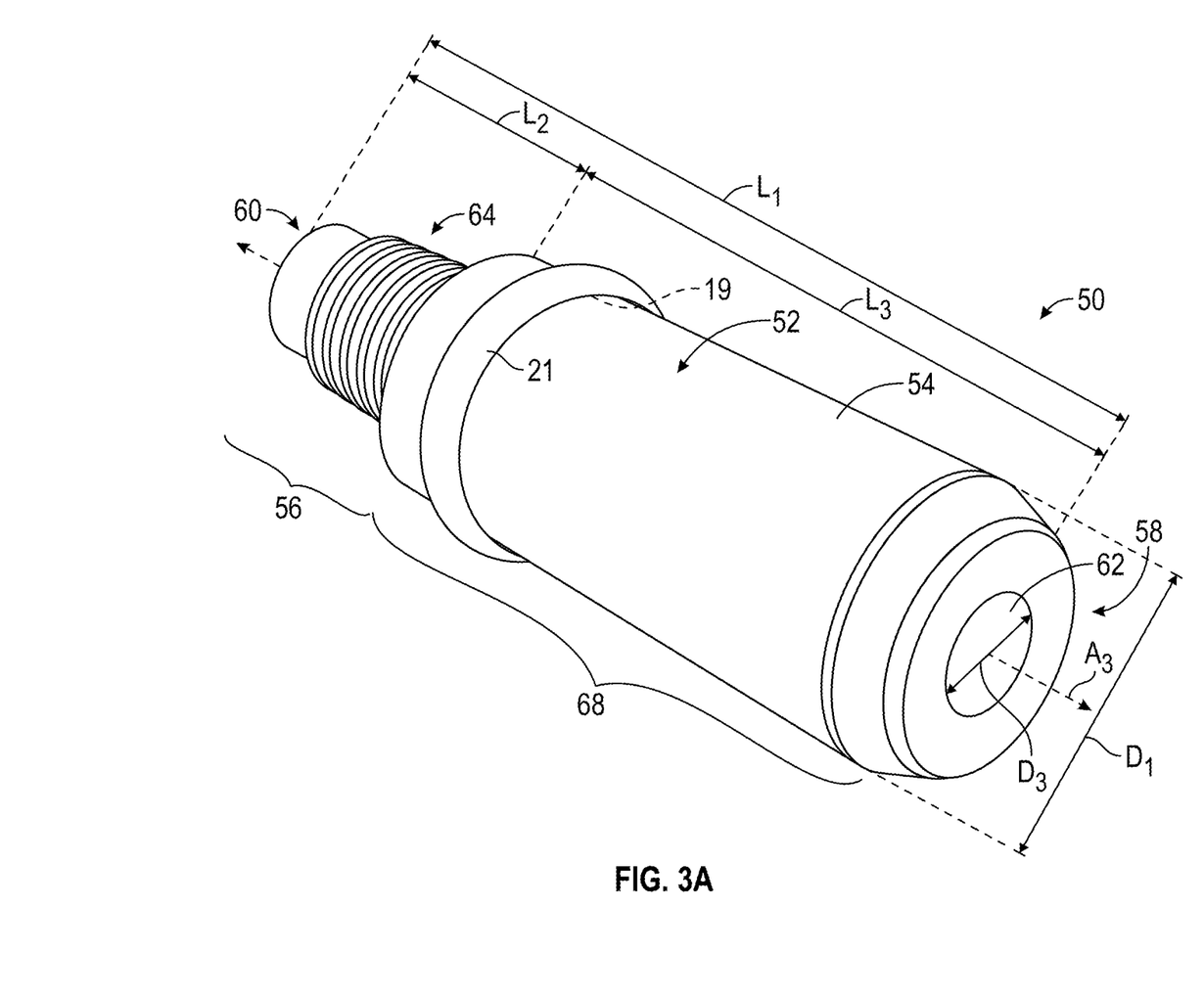
FIG. 3A schematically depicts a perspective view from the proximal end of an adapter probe according to an embodiment of the present disclosure.
Figure 3B:
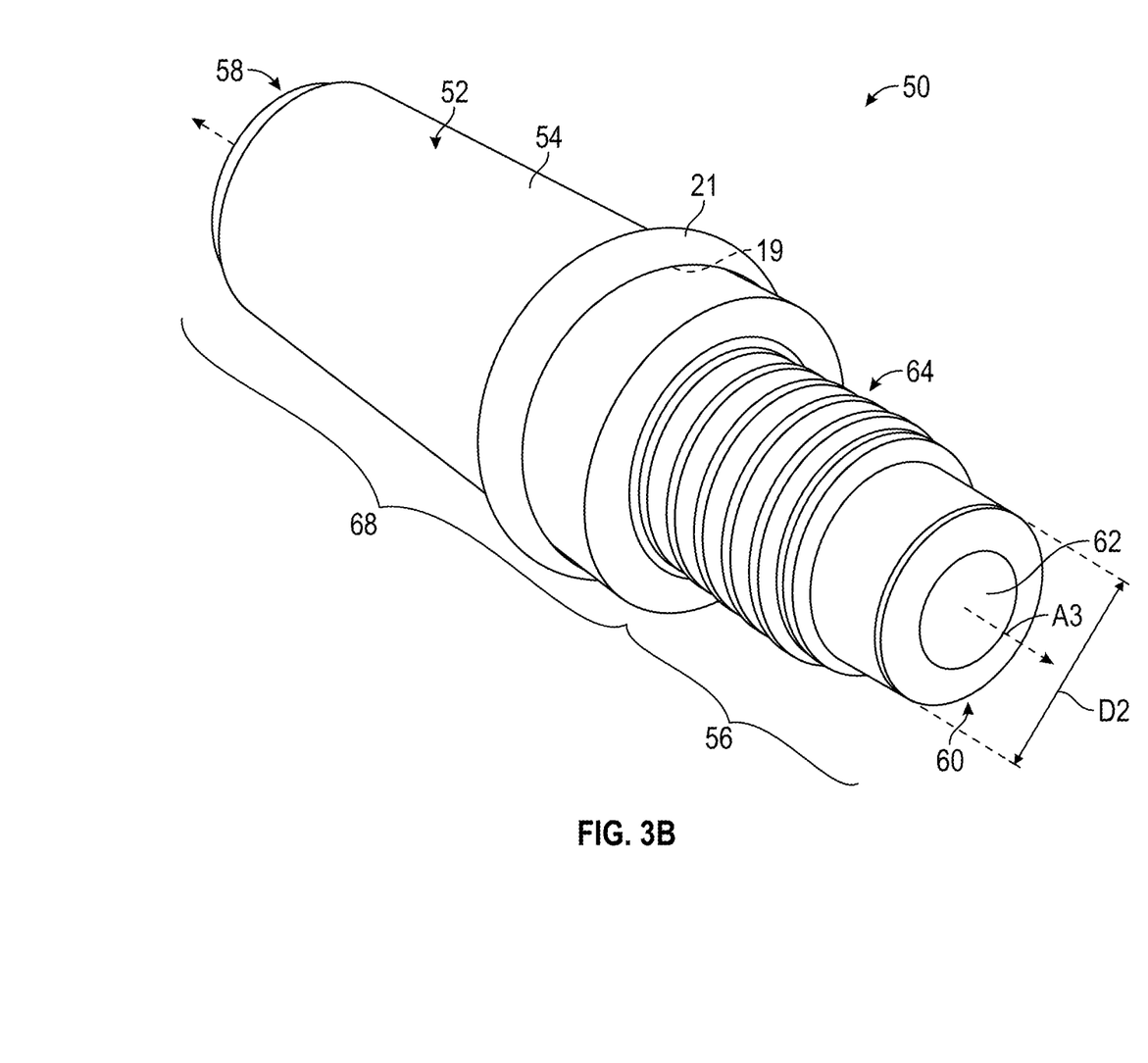
FIG. 3B schematically depicts a perspective view from the distal end of an adapter probe according to an embodiment of the present disclosure.

FIGS. 3A-B illustrate an embodiment of the adapter probe 50. The adapter probe 50 can include a body 52 that extends along a longitudinal axis $A_3$ a distance $L_1$ measured parallel to the longitudinal axis $A_3$ between a proximal end 58 and a distal end 60. For example, the body 52 can have a length $L_1$ of between approximately three (3) inches and approximately twelve (12) inches. The body 52 includes a cylindrical portion 68 and a connecting feature portion 56. The cylindrical portion 68 of the body 52 defines outer cylindrical surface 54, which has an outer diameter $D_1$, and extends a length $L_3$ from the proximal end to the connecting feature portion 56, measured parallel to the longitudinal axis $A_3$. Although depicted and being described as a cylindrical portion, exemplary embodiments of the portion 68 of the adapter probe 50 may be defined as other shapes. The connecting feature portion 56 is configured to at least partial engage with the cable connector 20 (FIG. 2B). The connecting feature portion 56 can be positioned at the distal end 60 of the adapter probe 50 and can extend a distance $L_2$ from the distal end 60 to the cylindrical portion 68, measured parallel to the longitudinal axis $A_3$. The connecting feature portion 56 can have an outer diameter $D_2$, which can be equal to or less than the outer diameter $D_1$ of the cylindrical portion 68 of the body 52. The diameter $D_2$ can be sized to correspond to the through-hole of the engagement portion 22 of the cable connector 20. The diameter of $D_1$ can be sized such that it matches, is slightly less than, or slightly greater than a diameter of the sealing interface 18 (FIG. 1). In some embodiments, the diameter $D_2$ can be greater than the diameter $D_1$ or the diameter $D_2$ can vary or taper from one end to the other. The connecting feature portion 56 can be axially positioned along the longitudinal axis $A_3$ so that it is coaxially aligned with the remainder of the body 52. It should be appreciated that the connecting feature portion 56 may be integrally formed with the cylindrical portion 68 or can be attached/fixed to the cylindrical portion 68 of the body 52. The connecting feature portion 56 can include a corresponding attachment feature to engage the engagement portion 22 of the cable connector 20. For example, the connecting feature portion 56 can include a threaded portion 64, which is configured to threadingly engage with the correspondingly threaded engagement portion 22 of the cable connector 20.

Adapter probe 50 can define the passageway or through-hole 62 that can extend axially through a center of the body 52 along the longitudinal axis $A_3$ to create a channel that extends from and is open at the proximal end 58 to the distal end 60 of the adapter probe 50. The passageway 62 can have an inner diameter $D_3$, which is less than $D_1$ and $D_2$. For example, the inner diameter $D_3$ can be between approximately 1/64 of an inch to approximately 1/4 of an inch. When the adapter probe 50 is mechanically engaged with the cable connector 20, the passageway 62 may be configured to transfer fluid through the passageway and into cavity 28 of the separable connector 10 or transfer fluid from within the cavity out of the separable connector 10. The proximal end 58 may be further configured to interface with one or more fluid delivery devices (e.g., hose, pipe, fastener, conduit) and/or one or more fluid vacuum or discard devices.

The adapter probe 50 can define one or more sealing features/elements, such as the O-ring 21, which may be positioned with respect to at least one surface of the adapter probe 50. For example, the sealing feature/element may be positioned about the outer surface 54 of the body 52. The sealing feature/element 66 may include an O-ring 21 for sealing a space between the adapter probe 50 and the sealing interface 18 of the separable connector 10 to create a fluid tight seal when adapter probe 50 is connected to cable connector 20 such that fluid cannot escape from the cavity 28 between the outer surface of the adapter probe and the inner surface of the separable connector 10. As described herein, the O-ring 21 may be positioned partially in a groove/indent 19 to, in part, assist in maintaining the position of the O-ring 21 to create a fluid tight seal when adapter probe 50 is inserted into the termination port 26 and connected to cable connector 20 (FIG. 2B).

Figure 4:
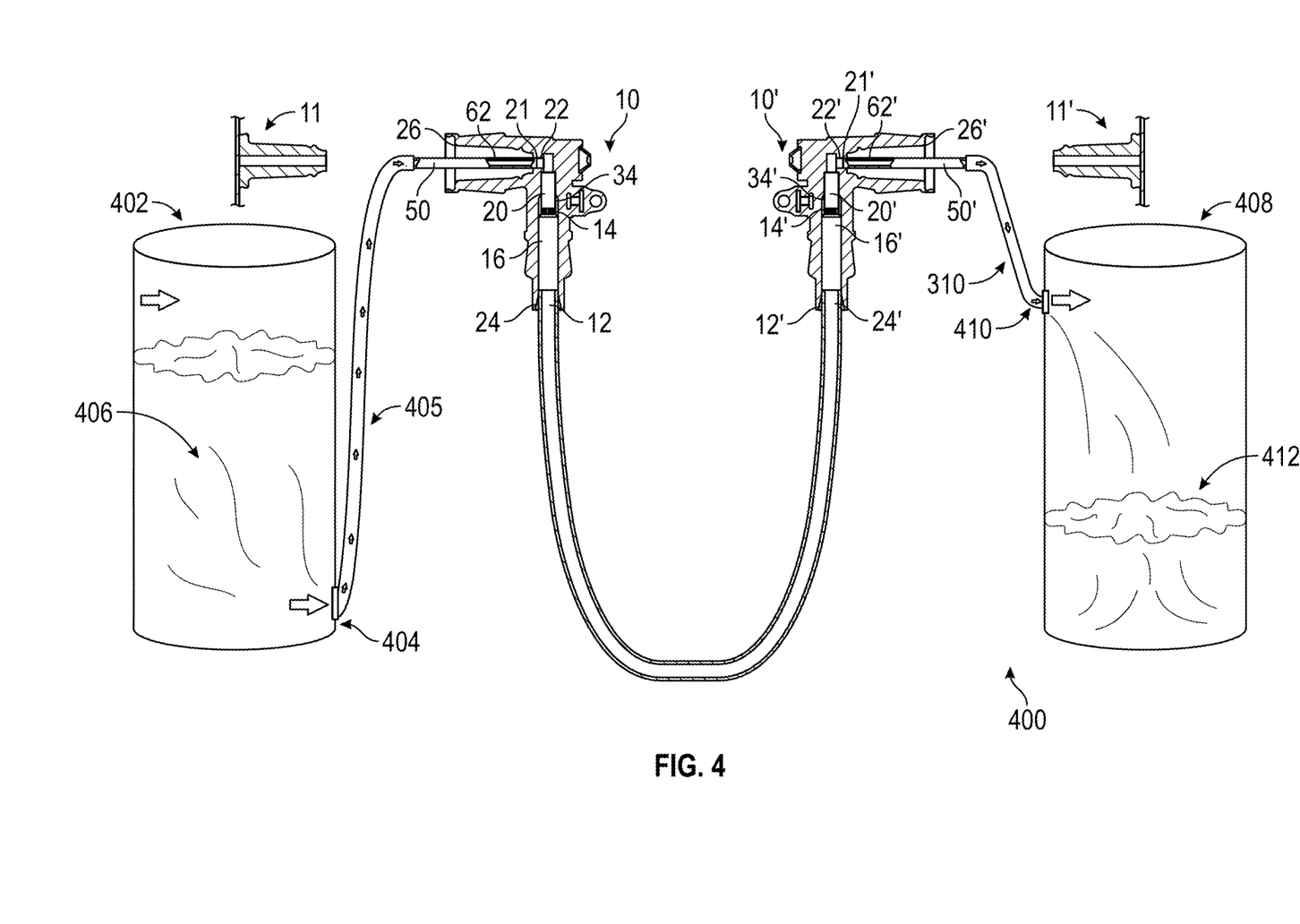
FIG. 4 schematically depicts a cable injection system assembly according to an embodiment of the present disclosure.

FIG. 4 illustrates a cable injection system 400. As depicted in FIG. 4, the cable injection system 400 may include at least one separable connector 10 operable coupled to the electrical cable 12 via the connection ports 24 and 24', as described herein. In an exemplary embodiment, the cable injection system 400 includes at least two separable connectors 10 and 10' and the electrical cable 12 extending between the two separable connectors 10 and 10' to electrically couple the two separable connectors 10 and 10'. In normal operation, the separable connectors 10 and 10' can each include electrical probes and can be connected to power terminals 11 and 11' of power devices (e.g., sources of energy or loads), respectively, where the electrical probe in each separable connector 10 and 10' electrically connects the electrical cable 12 to each of the power devices. When fluid is to be injected into the insulation of the electrical cable 12, which may be buried underground or otherwise inaccessible, one or both separable connectors 10 and 10' can be removed from the terminal(s) of the power device(s) and the electrical probe(s) can be removed. The adapter probes 50 and 50' can be inserted into the termination port(s) 26 and 26' of the separable connectors 10 and 10', respectively, in place of the removed electrical probe(s). For example, as shown in FIG. 4, in a non-limiting configuration, one of the adapter probes 50 is coupled to the separable connector 10 and one of the adapter probes 50' is coupled to the separable connector 10'. The adapter probes 50 and 50' are inserted into the termination port(s) 26 and 26' of the separable connectors 10 and 10'. The separable connectors 10 and 10' with the adapter probes inserted therein can be placed in fluid communication with a feed tank 402 and a discard tank 408 by way of fluid conduit 405 and 310, respectively. The feed tank 402 can be filled with fluid to be forced into the electrical cable 12 under pressure and/or the discard tank 408 can be under vacuum pressure to draw the fluid from the electrical cable 12.

For illustrative purposes, the feed tank 402 can be a supply tank and discard tank 408 can be a waste tank. The feed tank 402 can be in fluid communication with the electrical cable 12 via the fluid conduit 405, which can be in direct or indirect communication with the adapter probe 50, and the adapter probe 50 can be in direct or indirect contact with the separable connector 10. Particularly, the feed tank 402 can include one or more valves/fittings 404 that are in fluid communication with the first fluid conduit 405. The discard tank 408 may be in fluid communication with electrical cable 12 via the fluid conduit 310, which can be in direct or indirect communication with the adapter probe 50, and the adapter probe 50 can be in direct or indirect contact with separable connector 10'. Particularly, the discard tank 408 may include one or more valves/fittings 410 that are in fluid communication with the first fluid conduit 310.

Injection fluid 406 stored in the feed tank 402 can be injected into the electrical cable 12. The injection fluid 406 can be injected into the electrical cable 12 between the insulation layer 16 and the conductive core 14 under pressure via the adapter probe 50 of the separable connector 10. The fluid can be injected at varying pressures (e.g., 0.2 MPa to 0.4 MPa). The injection fluid 406 can pass through the adapter probe 50 of the separable connector 10 and into the cavity 28 of the separable connector 10. The injection fluid 406 may come in contact with the cable connector 20, the cavity 28, the gap 34, the conductive core 14, and/or the insulation layer 16. As the above-mentioned injection fluid 406 passes through the electrical cable 12 and exits out of the separable connector 10' (e.g., via the adapter probe 50 inserted into the separable connector 10'. Shown, as discard fluid 412, the injection fluid can come in contact with the insulation layer 16, the conductive core 14, the gap 34, the cavity 28, the cable connector 20, and the adapter probe 50 in the separable connector 10' before being output through the fluid conduit 310 and discharged into the discard tank 408. The injection fluid 406 can pass through the electrical cable 12 and may include water and other residual fluid (e.g., injection fluid) present within the electrical cable 12 and as such may become discard fluid 412.

Figure 5:
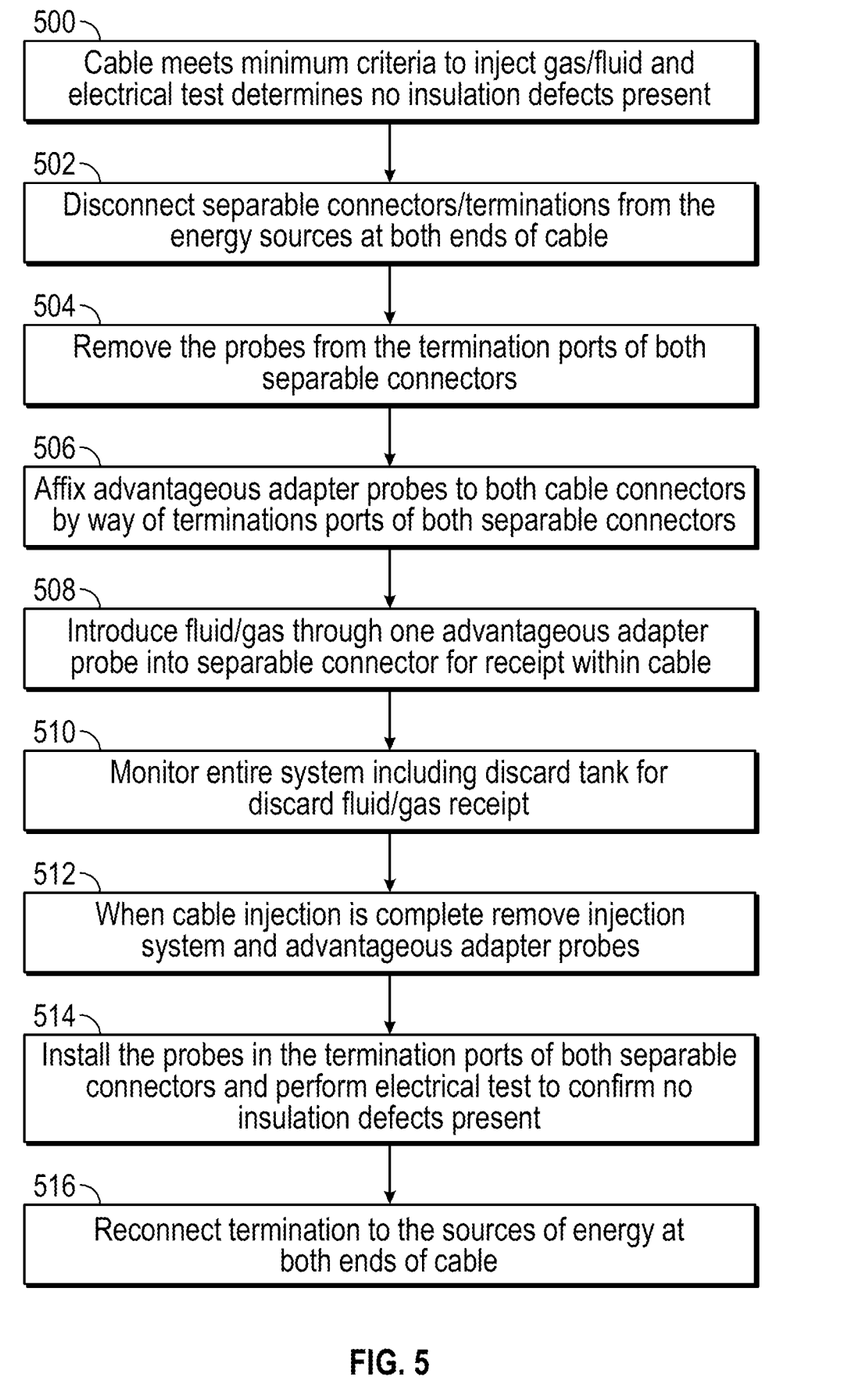
FIG. 5 is a flowchart illustrating a process for introducing fluid into an electrical cable, according to an embodiment of the present disclosure.

FIG. 5 is a flowchart illustrating an example process of injecting a fluid into an electrical cable. While the process of using the adapter probe 50 is described with reference to the cable injection system 400, it should be appreciated that exemplary embodiments of the adapter probe 50 are not limited to the assembly or configuration described with reference to FIG. 4. The process described herein with reference to FIG. 5 is merely illustrative of one of the many potential uses for the adapter probe 50.

At step 500, an electrical cable (e.g., electrical cable 12) is identified for receiving injection of a fluid (e.g., based on whether the electrical cable meets minimum criteria to inject a fluid and electrical test determines no insulation defects are present). At step 502, separable connectors (e.g., separable connectors 10) connected to the ends of the electrical cable are disconnected from electrical terminals of power devices. At step 504, electrical probes (e.g., electrical probes 15) are removed from separable connectors (e.g., from termination port 26 of separable connector 10). At step 506, adapter probes (e.g., adapter probe 50) are inserted into the separable connectors in place of the electrical probes at each end of the electrical cable. At step 508, an injection fluid (e.g., liquid, gas 406) is introduced through one of the adapter probes at a first end of the electrical cable into separable connector for receipt within the electrical cable. At step 510, the injection system (e.g., injection system 400) is monitored for injection fluid receipt within the electrical cable and discard fluid (e.g., discard fluid 412) discharged at a discard tank (e.g., discard tank 408) at a second end of the electrical cable. At step 512, upon completing the injection of fluid into the electrical cable, the injection system is removed and the adapter probes are removed probes. At step 514, the electrical probes are reinstalled back into separable connectors (or new electrical probes are installed). At step 516, the separable connectors with the electrical probes are reconnected to electrical terminals of the power devices.

Further, in operation, separable connector 10 may be configured to connect sources of energy (e.g., transformer, circuit breaker) via electrical cable (or cable section) 12. The sources of energy interface with a probe positioned within the termination port 26 of the separable connector 10. To begin, the separable connector 10 is removed from a power terminal 11. Then, the probe is removed from separable connector 10. In some instances, probe may be engaged with the cable connector 20, which is further engaged with the electrical cable 12. The probe may be unscrewed from the cable connector 20, however, additional removal techniques may be used. The above can be repeated as necessary for remaining separable connectors 10, if any. Then, with the source of energy disconnected, engage the adapter probe 50 at least partially with the separable connector 10 (e.g., termination port 26), as discussed herein. Particularly, the adapter probe 50 may be at least partially inserted into termination port 26 and even more particularly, adapter probe 50 may be threadingly engaged with termination port 26 and/or cable connector 20. The above can be repeated as necessary for remaining separable connectors 10. Affix one end of the one or more fluid conduits to the adapter probe 50 and the other end to one or more fluid tanks (e.g., feed tank, discard tank). For example, affix the first fluid conduit 405 to the first adapter probe 50 which is in communication with the electrical cable 12. Then, affix the second fluid conduit 310 to the second adapter probe 50', which is in communication with the electrical cable 12 and the first adapter probe 50. Inject an injection fluid from the feed tank 402 into the first fluid conduit 405 into the electrical cable 12. Injecting the injection fluid can force discard fluids (e.g., water, residual fluid) that are within the electrical cable 12 into the discard tank 408 by way of second fluid conduit 310. Once satisfied with the injection process, disconnect the necessary injection components and attach the probe to the separable connector 10 and to the power terminal 11, as known in the art and outlined above with respect to the removal of probe.

Figure 6:
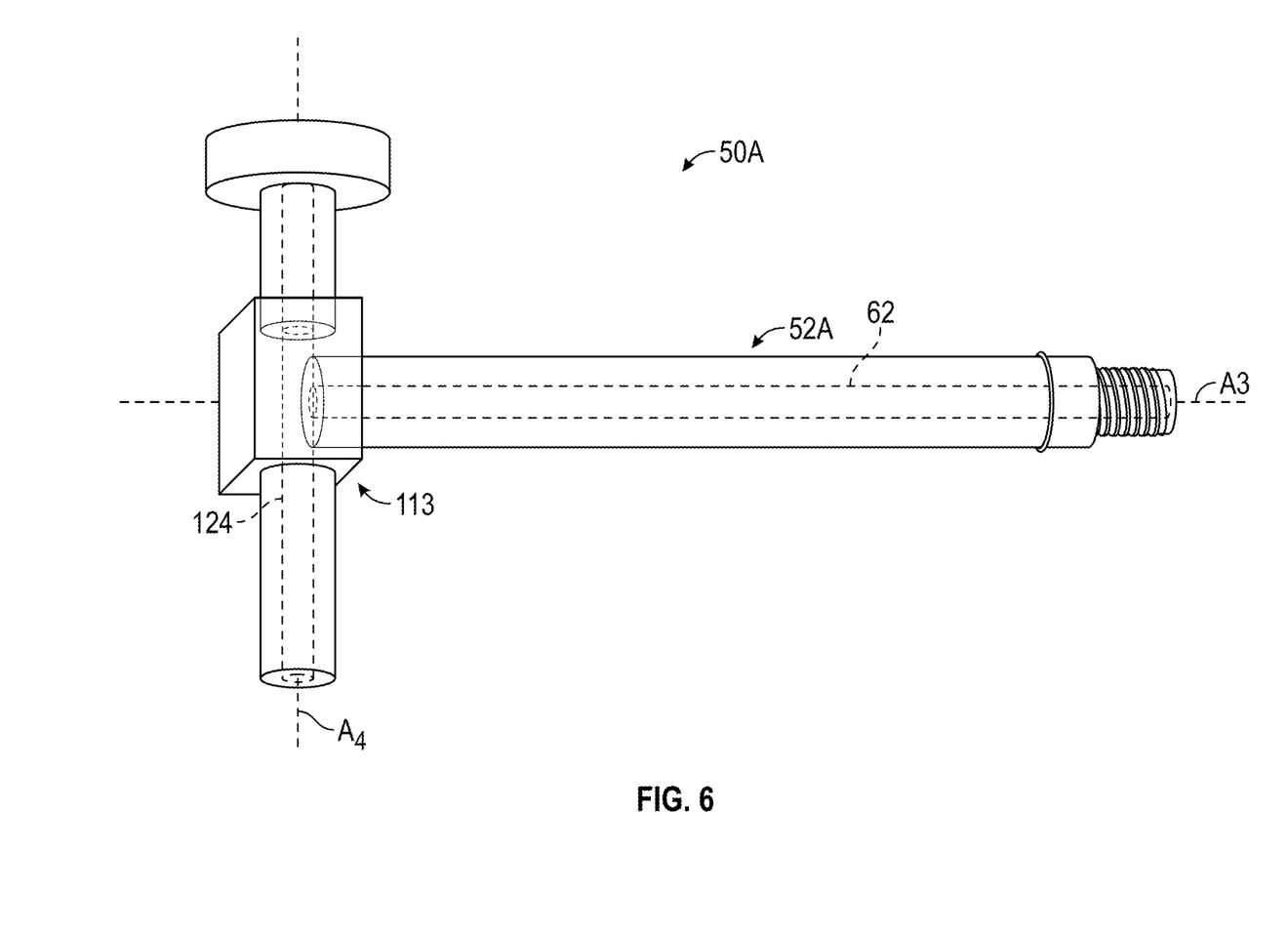
FIG. 6 depicts another example adapter probe according to an embodiment of the present disclosure.

FIG. 6 illustrates another embodiment of an adapter probe 50A. The adapter probe 50A. The adapter 50A can define a first adapter body 52A and a second adapter body 113. The first adapter body 52A can be identical to the body 52 of the adapter probe 50 except that a proximal end of the first adapter body 52A is operatively coupled to the second adapter body 113, which extends perpendicularly with respect to the first adapter body 52A. The proximal end of the first adapter body 52A interfaces with the second adapter body 113 at approximately the middle of the length of the second adapter body 113 such that the adapter probe 50A has an T-shaped configuration.

The first adapter body 52A can define the passageway or through-hole 62 described herein. The second adapter body 113 can define a passageway or through-hole 124 that may extend axially through a center of the body 113 along the longitudinal axis $A_4$ to create a channel. The passageway 62 of the first adapter body can be open at the proximal end and distal end and can be in fluid communication with the passageway 124 of the second adapter body 113. In some embodiments, one end of the second adapter body 113 can be capped or closed to terminate the passageway 124. In some embodiments, both ends of the second adapter body 113 can be open to the passageway 124. An open end of the second adapter body 113 can be configured to interface with one or more fluid carrying devices (e.g., hose, pipe, fitting, conduit) for introducing fluid into the passageway 124 and passageway 62 or for receiving fluid from the passageway 62 and passageway 124. For example, the adapter probe 50A can be configured to provide fluid, through the passageways 124 and 62 to the electrical cable 12 when the adapter probe 50A is inserted into the termination port of separable connector 10 and the electrical cable is inserted into the connection terminal of the separable connector 10.

Figure 7:
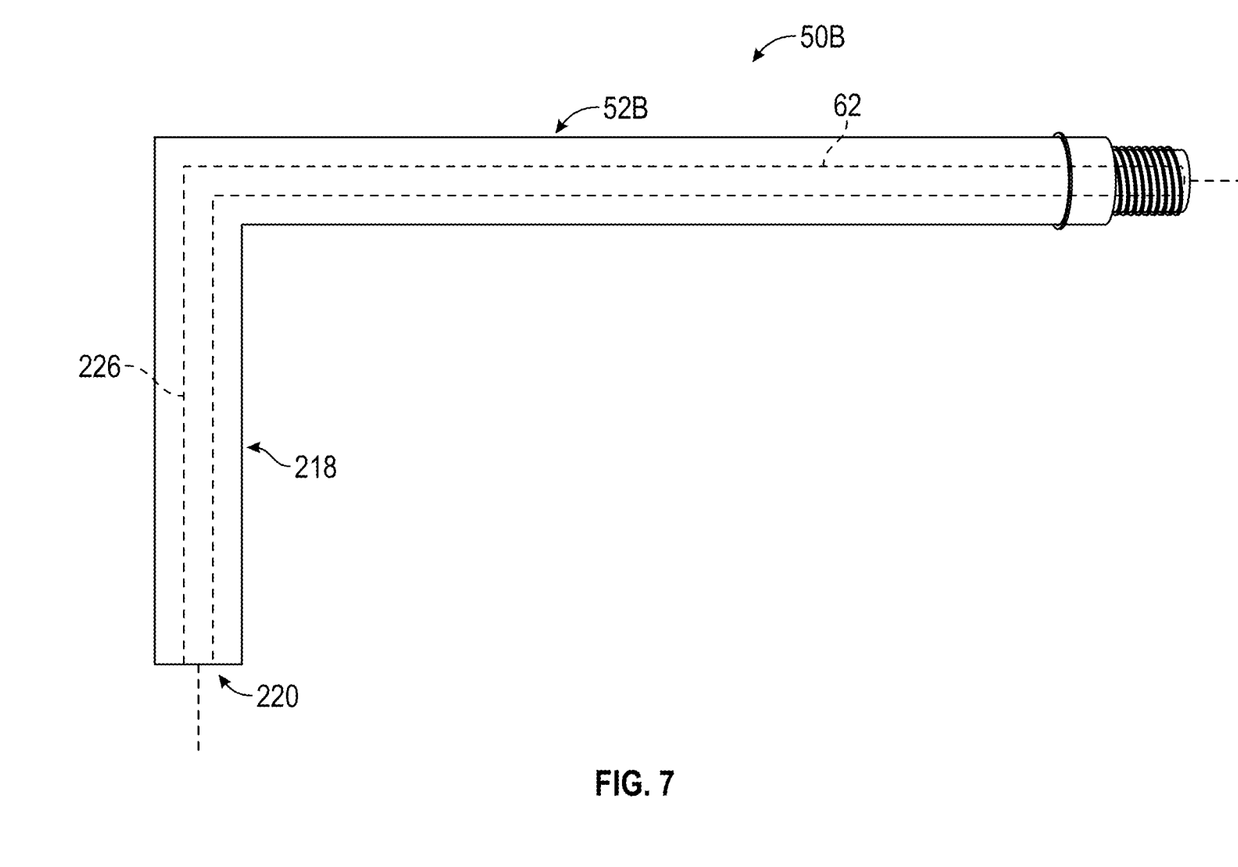
FIG. 7 depicts yet another example adapter probe according to an embodiment of the present disclosure.

FIG. 7 illustrate another embodiment of an adapter probe 50B. The adapter probe 50B can define a first adapter body 52B and a second adapter body 218. The first adapter body 52A can be identical to the body 52 of the adapter probe 50 except that a proximal end of the first adapter body 52A is operatively coupled to the second adapter body 218, which extends perpendicularly from the proximal end of the first adapter body 52B such that the adapter probe 50B has an L-shaped configuration.

The first adapter body 52B can define the passageway or through-hole 62 described herein. The second adapter body 218 can define a passageway or through-hole 226 that may extend axially through a center of the second body portion 218 along the longitudinal axis $A_1$ to create a channel. The passageway 62 of the first adapter body 62 can be open at the proximal end and can be in fluid communication with the passageway 226 of the second adapter body 218. An open end 220 of the second adapter body 218 can be configured to interface with one or more fluid carrying devices (e.g., hose, pipe, fitting, conduit) for introducing fluid into the passageway 226 and passageway 62 or for receiving fluid from the passageway 62 and passageway 226. For example, the adapter probe 50B can be configured to provide fluid, through the passageways 226 and 62 to the electrical cable 12 when the adapter probe 50B is inserted into the termination port of separable connector 10 and the electrical cable is inserted into the connection terminal of the separable connector 10.

Figure 8:
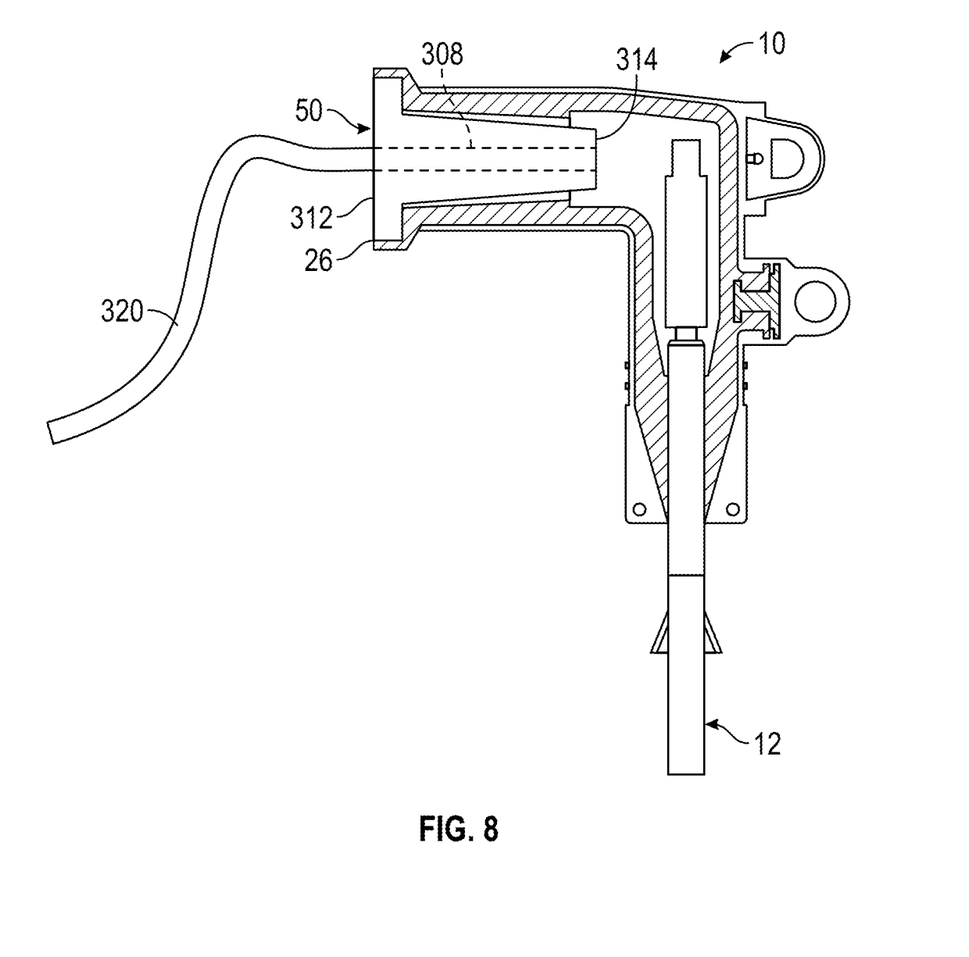
FIG. 8 depicts still another example adapter probe according to an embodiment of the present disclosure.

FIG. 8 illustrates another embodiment of an adapter probe 50C. The adapter probe 50C can at least partially engage with the termination port 26 of the separable connector 10 when the electrical probe is removed. The adapter 50C can be a plug formed of a resilient material, such as a polymer (e.g., rubber). The plug can have a generally truncated cone configuration, where a proximal end 312 forms a base on the truncated cone. A diameter of the plug can be at least partially tapered radially inwardly along from the proximal end 312 to a distal end 314. The adapter 50C can further define the passageway 308 that can extend between and open to the proximal end 312 and distal end 314. In an exemplary embodiment, the passageway 308 can extend through a central axis of the adapter probe 50C. The adapter probe 50C and passageway 308 can be configured to interface with one or more fluid carrying devices 320 (e.g., hose, pipe, fitting, conduit) to introduce fluid into the passageway 308 or for receiving fluid from the passageway 308. For example, the adapter probe 50C can be configured to provide fluid, through the passageways 308 to the electrical cable 12 when the adapter probe 50C is inserted into the termination port of separable connector 10 and the electrical cable is inserted into the connection terminal of the separable connector 10.

As will be readily apparent to persons skilled in the art, the present disclosure may be embodied in other specific forms without departing from the spirit or essential characteristics thereof. The present embodiments are therefore to be considered in all respects as illustrative and not prescriptive nor restrictive.

The invention claimed is:

1. A method for introducing fluid to an electrical cable affixed to a first port of a separable connector, the method comprising:
    disconnecting the separable connector from a source of energy;
    confirming the cable is a candidate for injection;
    removing an electrical probe from a termination port of the separable connector;
    affixing an adapter probe to the termination port of the separable connector, wherein a connection port and the termination port are in communication; and
    introducing a fluid through the adapter probe into the separable connector via the adapter probe at the terminal port for receipt within the electrical cable at the connection port.

2. The method of claim 1, wherein the adapter probe is releasably engaged with the separable connector.

3. The method of claim 2, wherein the adapter probe is threadingly engaged with a cable connector positioned within the separable connector and in communication with the electrical cable.

4. The method of claim 1, wherein the adapter probe includes a passageway extending from a proximal end of the adapter probe to a distal end of the adapter probe, and
    wherein introducing the fluid comprises urging fluid through the passageway into a cavity of the separable connector.

5. The method of claim 4, wherein the adapter probe includes a sealing element disposed about an outer surface of the adapter probe that interfaces with a sealing interface of the separable connector to create a seal that prevents fluid from escaping the cavity between the outer surface of the adapter probe and an inner surface of the separable connector.

6. The method of claim 1, further comprises:
    removing the adapter probe after the fluid is introduced into the electrical cable;
    reinstalling the electrical probe in the separable connector at the terminal port; and
    reconnecting the separable connector to the source of energy.

7. A system for introducing fluid to an electrical cable, the system comprising:
    a separable connector having a connecting port and a termination port, wherein the electrical cable is affixed to the connecting port and the termination port is configured to be connected to a terminal of a power device, the connecting and termination ports are in communication with each other;
    in a first state, the separable connector includes an electrical probe associated with the termination port configured for electrical connection with the terminal of the power device; and
    in a second state, the separable connector includes an adapter probe associated with the termination port in place of the electrical probe, the adapter probe is configured to introduce a fluid into the electrical cable via the termination port.

8. The system of claim 7, wherein the adapter is releasably engaged with the separable connector.

9. The system of claim 8, wherein the adapter is threadingly engaged with a cable connector positioned within the separable connector and in communication with the electrical cable.

10. The system of claim 7, wherein the adapter port includes a passageway extending from a proximal end to a distal end, and the fluid is introduced into the electrical cable via the passageway.

11. The system of claim 7, wherein the adapter probe includes a sealing element disposed about an outer surface of the adapter probe that interfaces with a sealing interface of the separable connector to create a seal that prevents fluid from escaping the cavity between the outer surface of the adapter probe and an inner surface of the separable connector.

12. The system of claim 7, wherein a body of the adapter probe has an cylindrical portion and a connecting feature portion, the cylindrical portion extending between the proximal end and the connecting feature portion and the connecting feature portion extending between the distal end of the cylindrical portion.

13. The system of claim 12, wherein the connecting feature portion has diameter that is less than the diameter of the cylindrical portion and includes a threaded portion for interfacing with an engagement portion of a cable connector disposed in the separable connector.

\* \* \* \* \*